US010252812B2

(12) United States Patent
Gutz (10) Patent No.: US 10,252,812 B2
(45) Date of Patent: Apr. 9, 2019

(54) SYSTEM AND METHOD FOR CONTROLLING FUEL FLOW TO A GAS TURBINE ENGINE BASED ON MOTION SENSOR DATA (71) Applicant: General Electric Company, Schenectady, NY (US)

(72) Inventor: David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 15/278,413

(22) Filed: Sep. 28, 2016

(65) Prior Publication Data

US 2018/0086474 A1 Mar. 29, 2018

(51) Int. Cl.
| G05D 1/00 | (2006.01) |
| G05D 3/00 | (2006.01) |
| G05D 13/00 | (2006.01) |
| G05D 1/08 | (2006.01) |
| B64D 37/00 | (2006.01) |
| B64D 27/10 | (2006.01) |

(Continued)

(52) U.S. Cl.
CPC .............. *B64D 37/00* (2013.01); *B64D 27/10* (2013.01); *F02C 9/00* (2013.01); *F02C 9/26* (2013.01); *F02C 9/28* (2013.01); *F02C 9/42* (2013.01); *F02C 9/44* (2013.01); *G06F 15/00* (2013.01)

(58) Field of Classification Search
None
See application file for complete search history.

(56) References Cited

U.S. PATENT DOCUMENTS

| 4,038,526 A | 7/1977 | Eccles et al. |
| 5,265,826 A * | 11/1993 | Ebert ............... G05D 1/0858 244/17.13 |

(Continued)

FOREIGN PATENT DOCUMENTS

EP 2441938 A1 4/2012

OTHER PUBLICATIONS

Wikipedia, Accelerometer, The Free Encyclopedia, https://en.wikipedia.org/wiki/Accelerometer, Jul. 18, 2016, 9 pages.

(Continued)

*Primary Examiner* — Adam D Tissot
(74) *Attorney, Agent, or Firm* — General Electric Company; Sean M. Weinman (57) ABSTRACT A system for an aircraft having a first gas turbine engine and a second gas turbine engine includes a first engine controller comprising a first motion sensor. The first motion sensor defines a first orthogonal coordinate system, and is configured for determining first motion sensor data indicating motion of the aircraft along at least one axis of the first orthogonal coordinate system. The system further includes a second engine controller comprising a second motion sensor spaced apart from the first motion sensor. The second motion sensor defines a second orthogonal coordinate system, and is configured for determining second motion sensor data indicating motion of the aircraft along at least one axis of the second orthogonal coordinate system. In addition, the second engine controller is communicatively coupled to the first engine controller such that the first engine controller receives the second motion sensor data.

20 Claims, 5 Drawing Sheets (51) Int. Cl.
  *F02C 9/44* (2006.01)
  *F02C 9/00* (2006.01)
  *F02C 9/26* (2006.01)
  *F02C 9/28* (2006.01)
  *F02C 9/42* (2006.01)
  *G06F 15/00* (2006.01)

(56) References Cited

U.S. PATENT DOCUMENTS

| | | |
|---|---|---|
| 6,195,247 B1 | 2/2001 | Cote et al. |
| 7,931,231 B2 * | 4/2011 | Cherepinsky ......... B64C 13/503 244/17.13 |
| 8,311,579 B2 | 11/2012 | Rofougaran et al. |
| 8,327,117 B2 | 12/2012 | Smilg et al. |
| 8,965,288 B2 | 2/2015 | Barnes et al. |
| 8,989,921 B2 | 3/2015 | Nannoni et al. |
| 2015/0292967 A1 | 10/2015 | McArthur |
| 2016/0009377 A1 | 1/2016 | Khalid |

OTHER PUBLICATIONS

International Search Report and Written Opinion issued in connection with corresponding PCT Application No. PCT/US2017/047712 dated Jan. 22, 2018.

* cited by examiner

SYSTEM AND METHOD FOR CONTROLLING FUEL FLOW TO A GAS TURBINE ENGINE BASED ON MOTION SENSOR DATA

FIELD OF THE INFORMATION

The present subject matter relates generally to gas turbine engines and, more particularly, to a system and method for anticipating changes in the fuel flow demand of a gas turbine engine.

BACKGROUND OF THE INVENTION

A gas turbine engine generally includes, in serial flow, a compressor section, a combustion section, a turbine section and an exhaust section. In operation, air enters an inlet of the compressor section where one or more compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

Turbo shaft engines, a type of gas turbine engine typically used on helicopters, generally include a power turbine spool comprising a power turbine that drives an external load, such as a main rotor of the helicopter. Helicopter flight maneuvers quickly change the engine power demand on the power turbine. However, in order to achieve optimal handling qualities for the helicopter, a desired rotor speed must be maintained when delivering a requested change in the engine power demand of the power turbine.

Accordingly, a system and method for improving handling of aircraft in response to rapid changes in engine power demand are welcomed within the technology.

BRIEF DESCRIPTION OF THE INVENTION

Aspects and advantages of the invention will be set forth in part in the following description, or may be obvious from the description, or may be learned through practice of the invention.

In a first exemplary embodiment, a method for controlling a fuel flow to one or more gas turbine engines of an aircraft is provided. The method includes receiving, by an engine controller of the one or more gas turbine engines, motion sensor data from at least two motion sensors spaced apart from one another and associated with a respective gas turbine engine of the aircraft. More specifically, the received motion sensor data indicates motion of the aircraft. The method further includes adjusting the fuel flow to the gas turbine engine based, at least in part, on the received motion sensor data.

In a second exemplary embodiment, a system for an aircraft having a first gas turbine engine and a second gas turbine engine is provided. The system includes a first engine controller comprising a first motion sensor. The first motion sensor defines a first orthogonal coordinate system and is configured for determining first motion sensor data indicating motion of the aircraft along at least one axis of the first orthogonal coordinate system. The system further includes a second engine controller comprising a second motion sensor spaced apart from the first motion sensor. The second motion sensor defines a second orthogonal coordinate system and is configured for determining second motion sensor data indicating motion of the aircraft along at least one axis of the second orthogonal coordinate system. In addition, the second engine controller is communicatively coupled to the first engine controller such that the first engine controller receives the second motion sensor data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component from another and does not signify location or importance of the individual components.

In general, the present disclosure is directed to a system and method for adjusting fuel flow to one or more gas turbine engines of an aircraft based, at least in part, on motion sensor data received from at least two motion sensors spaced apart from one another and associated with a respective gas turbine engine of the aircraft. More specifically, the system includes an engine controller configured to estimate changes to engine power demand of the aircraft based, at least in part, on the received motion sensor data. Further, the engine controller calculates a fuel flow demand of the gas turbine engine based, at least in part, on the estimated changes to the engine power demand. Still further, the engine controller adjusts a fuel flow to the gas turbine engine such that the adjusted fuel flow matches the calculated fuel flow demand. Accordingly, the system provides improved handling of the aircraft.

It should be appreciated that the systems and method of the present disclosure may generally be used to improve the operation and efficiency of any suitable type of aircraft-based turbine engine. For example, the system may be used to improve handling of a helicopter. More specifically, the system may maintain the main rotor shaft of the helicopter at a desired rotational speed to prevent blade droop.

Figure 1:
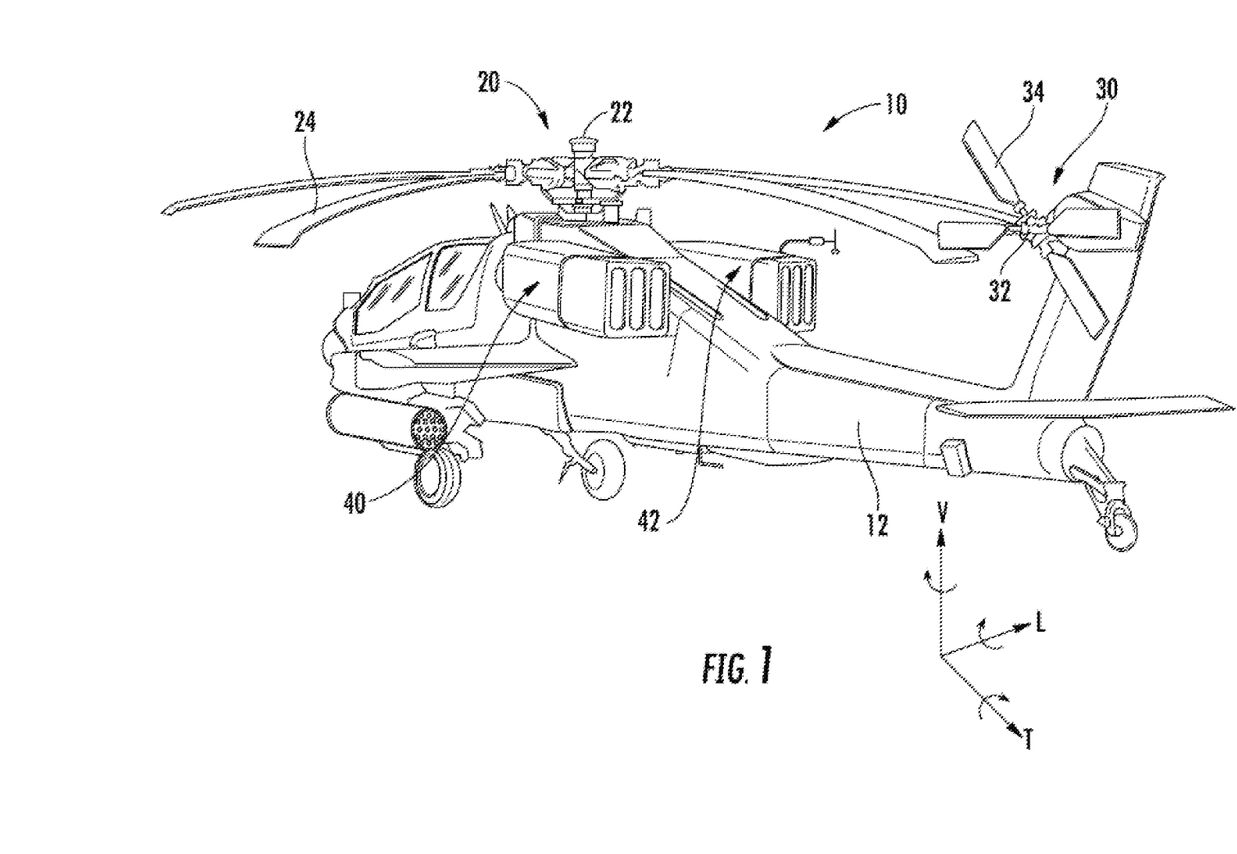
FIG. 1 is a schematic cross-sectional view of an aircraft in accordance with one embodiment of the present disclosure.

FIG. 1 provides a perspective view of an exemplary aircraft 10 in accordance with the present disclosure. The aircraft 10 defines an orthogonal coordinate system, including three orthogonal coordinate axes. More specifically, the three orthogonal coordinate axes include a lateral axis L, a transverse axis T, and a vertical axis V. In operation, the aircraft 10 may move along or around at least one of the lateral axis L, the transverse axis T, and the vertical axis V.

The aircraft 10 includes an airframe 12, a main rotor assembly 20, and a tail rotor assembly 30. The main rotor assembly 20 includes a main rotor hub 22 and a plurality of main rotor blades 24. As shown, each main rotor blade 24 extends outward from the main rotor hub 22. The tail rotor section 30 includes a tail rotor hub 32 and a plurality of tail rotor blades 34. Each tail rotor blade 34 extends outward from the tail rotor hub 32.

The aircraft 10 further includes a first gas turbine engine 40 and a second gas turbine engine 42. The first and second gas turbine engines 40, 42 generate and transmit torque to drive rotation of the main rotor blades 24 and the tail rotor blades 34. In particular, rotation of the main rotor blades 24 generates lift for the aircraft 10, while rotation of the tail rotor blades 34 generates thrust and counteracts torque exerted on the airframe 12 by the main rotor blades 24.

It should be appreciated that, although a particular helicopter has been illustrated and described, other configurations and/or aircraft, such as high speed compound rotary-wing aircraft with supplemental translational thrust systems, dual contra-rotating, coaxial rotor system aircraft, turbo-props, tilt-rotors, tilt-wing aircraft, conventional take-off and landing aircraft and other turbine driven machines will also benefit from the present disclosure.

Figure 2:
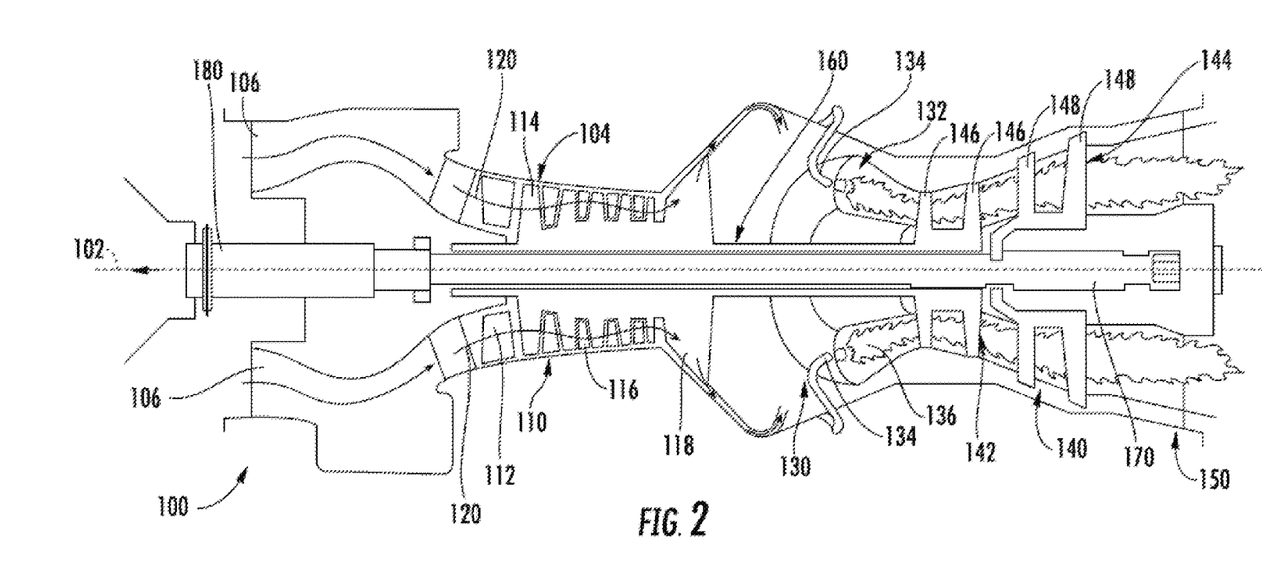
FIG. 2 is a schematic cross-sectional view of a gas turbine engine in accordance with one embodiment of the present disclosure.

FIG. 2 provides a schematic cross-sectional view of an exemplary gas turbine engine 100 in accordance with the present disclosure. As shown in FIG. 2, the gas turbine engine 100 defines a longitudinal or centerline axis 102 extending therethrough for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential stages of compressor blades 114, one or more sequential stages of compressor vanes 116, and a centrifugal compressor 118. Collectively, the compressor blades 114, the compressor vanes 116, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gas 136 drives the turbine 140.

The turbine 140 includes a gas generator turbine 142 and a power turbine 144. The gas generator turbine 142 includes one or more sequential stages of turbine rotor blades 146, and the power turbine 144 includes one or more sequential stages of turbine rotor blades 148. Further, as will be discussed below in more detail, the gas generator turbine 142 drives the gas generator compressor 110 via a gas generator shaft 160, and the power turbine 144 drives an output shaft 180 via a power turbine shaft 170.

As shown in the embodiment illustrated in FIG. 2, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 40, 42 of FIG. 1, and the output shaft 180 may rotate both the main and tail rotor blades 24, 34 of the aircraft 10.

Figure 3:
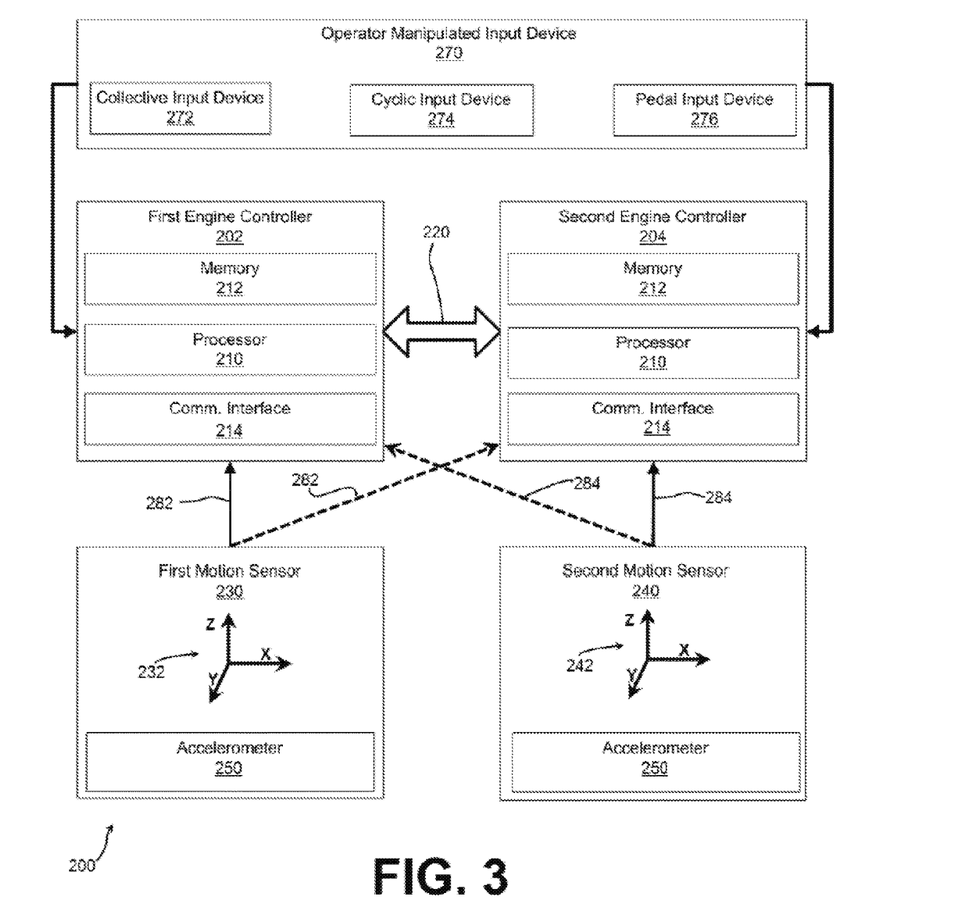
FIG. 3 illustrates a schematic view of one embodiment of a system for controlling fuel flow to a gas turbine engine in accordance with the present disclosure.

Referring now to FIG. 3, one embodiment of a system 200 for controlling fuel flow to one or more gas turbine engines of an aircraft based, at least in part, on motion of the aircraft is illustrated in accordance with aspects of the present disclosure. In general, the system 200 will be described herein with reference to the aircraft and gas turbine engine of FIGS. 1 and 2. However, in other embodiments, the system 200 may be implemented or used in association with any other suitable aircraft and/or any other suitable gas turbine engine.

As shown in the embodiment illustrated in FIG. 3, the system 200 includes first and second engine controllers 202, 204. The exemplary first and second engine controllers 202, 204 each generally include one or more processor(s) 210 and associated memory 212 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), and other programmable circuits. Additionally, the memory 212 may generally include memory element(s) including, but not limited to, computer readable medium (e.g., random access memory (RAM)), computer readable non-volatile medium (e.g., flash memory), a floppy disk, a compact disc-read only memory (CD-ROM), a magneto-optical disk (MOD), a digital versatile disc (DVD) and/or other suitable memory elements.

It should be appreciated that the first and second engine controllers 202, 204 may each be configured as a Full Authority Digital Engine Controller (FADEC). More specifically, the FADEC may be configured to automatically control operation of a gas turbine. As an example, the first engine controller 202 may be a FADEC configured to control the operation of the first gas turbine engine 40, and the second engine controller 202 may be a FADEC configured to control the operation of the second gas turbine engine 42.

The first and second engine controllers 202, 204 each include a communication interface 214. It should be appreciated that the communication interface 214 may be any suitable wired or wireless communications interface. Further, as shown in FIG. 3, the processor 210 of the first engine controller 202 is communicatively coupled to the processor 210 of the second engine controller 204 via a data bus 220. It should be appreciated that the data bus 220 may be any suitable communications interface (i.e., any suitable wired or wireless communications interface).

The first engine controller 202 further includes a first motion sensor 230, and the second engine controller 204 includes a second motion sensor 240. The first motion sensor 230 defines a first orthogonal coordinate system 232, and the second motion sensor 240 defines a second orthogonal coordinate system 242. More specifically, the first and second orthogonal coordinate systems 232, 242 each include three orthogonal axes, specifically an X-axis, a Y-axis, and a Z-axis. As such, the first motion sensor 230 may be configured to detect motion along one or more orthogonal axes of the first orthogonal coordinate system 232, and the second motion sensor may be configured to detect motion along one or more orthogonal axes of the second orthogonal coordinate system 242.

As shown in FIG. 3, the first and second motion sensors 230, 240 are oriented such that the Z-axis of the first orthogonal coordinate system 232 is substantially parallel to the Z-axis of the second orthogonal coordinate system 242. It should be appreciated, however, that the first motion sensor 230 may be oriented differently relative to the second motion sensor 240. For example, the first motion sensor 230 may be oriented such that the Z-axis of the first orthogonal coordinate system 232 is substantially perpendicular to the Z-axis of the second orthogonal coordinate system 242.

In one exemplary embodiment, the first motion sensor 230 is mounted to the first gas turbine engine 40 of the aircraft 10, and the second motion sensor 240 is mounted to the second gas turbine engine 42 of the aircraft 10. The first and second gas turbine engines 40, 42 are typically spaced apart from one another (as is indicated schematically by the positioning of the first and second engine controllers 202, 204). For example, the first and second gas turbine engines 40, 42 may be positioned far enough away from one another such that normal vibrations and other positional variances during operation of the aircraft 10 do not cause the two engines to contact one another. As such, the first and second motion sensors 230, 240 are spaced apart from one another, e.g., along the lateral direction L (FIG. 1). Further, the first and second motion sensors 230, 240 are oriented on the first and second gas turbine engines 40 and 42, respectively, such that the Z-axis of both the first and second orthogonal coordinate systems 232, 242 are parallel to the vertical axis V of the aircraft 10. As such, detected motion along the Z-axis indicates the aircraft 10 is moving up or down along the vertical direction V. Still further, detected motion along the Y-axis indicates movement of the aircraft 10 along the transverse axis T, and detected motion along the X-axis indicates movement of the aircraft 10 along the lateral axis L.

For the embodiment depicted, the first and second motion sensors 230, 240 each also include an accelerometer 250. In particular, the accelerometer 250 of the first motion sensor 230 is configured to detect acceleration of the aircraft 10 along at least one axis of the first orthogonal coordinate system 232, and the accelerometer 250 of the second motion sensor 240 is configured to detect acceleration of the aircraft 10 along at least one axis of the second orthogonal coordinate system 242. It should be appreciated, however, that in other exemplary embodiments, the motion sensors 230, 240 may additionally or alternatively include any other suitable motion sensor or combination of motion sensors (see, e.g., FIG. 4).

As shown, the first motion sensor 230 provides first motion sensor data 282 to the first engine controller 202, and the second motion sensor 230 provides second motion sensor data 284 to the second engine controller 204. In an alternative embodiment, the first motion sensor 230 may provide the first motion sensor data 282 to the second engine controller 204, and/or the second motion sensor 240 may provide the second motion sensor data 284 to the first engine controller 202. In yet another alternative embodiment, the first motion sensor 230 may provide the first motion sensor data 282 to both the first and second engine controllers 202 and 204, and/or the second motion sensor 240 may provide the second motion sensor data 284 to both the first and second engine controllers 202 and 204. It should be appreciated that the first and second motion sensor data 282, 284 may be exchanged between first and second engine controllers 202, 204 via the data bus 220.

In the embodiment depicted in FIG. 3, the first motion sensor data 282 indicates acceleration of the aircraft 10 along at least one axis of the first orthogonal coordinate system 232, and the second motion sensor data 284 indicates acceleration of the aircraft 10 along at least one axis of the second orthogonal coordinate system 242. More specifically, the first and second motion sensor data 282, 284 may include a first value indicating a magnitude of an acceleration force acting on the X-axis, a second value indicating a magnitude of an acceleration force acting on the Y-axis, and a third value indicating a magnitude of an acceleration force acting on the Z-axis.

It should be appreciated that the first, second and third values may be a digital value. For example, the motion sensors may include an analog-to-digital converter (ADC) having an n-bit resolution. Further, the ADC may be configured to convert analog voltages read from each channel (X, Y and Z) of the accelerometer 250 to a corresponding digital value between 0 and $2^n-1$. Alternatively, the first, second and third values may be provided to the first and second engine controllers 202, 204 as an analog voltage.

It should be appreciated, however, that in other embodiments, the first and second motion sensors 230, 240 may process/communicate motion sensor data in any other suitable manner. For example, the first motion sensor data 282 of the first motion sensor 230 may include a vector quantity indicating both a magnitude and a direction of the detected acceleration. It should be appreciated that motion sensor data 284 from the second motion sensor 240 may also include a vector quantity indicating both a magnitude and a direction of the detected acceleration.

In one exemplary embodiment, one or both of the first and second engine controllers 202, 204 is configured to process both the first and second motion sensor data 282, 284 to determine a speed, direction, and rotation of the aircraft 10. Specifically, one or both of the first and second engine controllers 202, 204 may be configured to receive the first and second motion sensor data 282, 284 from both the first and second motion sensors 230, 240 (which are spaced apart from one another) to determine information about a movement of the aircraft 10, which would otherwise be unobtainable using a single motion sensor. For example, the first motion sensor 230 may indicate the first gas turbine engine 40 is moving along the Z-axis of the first orthogonal coordinate system 232 at a first speed, while the second motion sensor 240 may indicate the second gas turbine engine 42 is moving along the Z-axis of the second orthogonal coordinate system 242 at a second speed (different from the first speed). Accordingly, one or both of the first and second engine controllers 202, 204 may use such information, which is included in the first and second motion sensor data 282 and 284, to determine the aircraft 10 is beginning to rotate.

Figure 4:
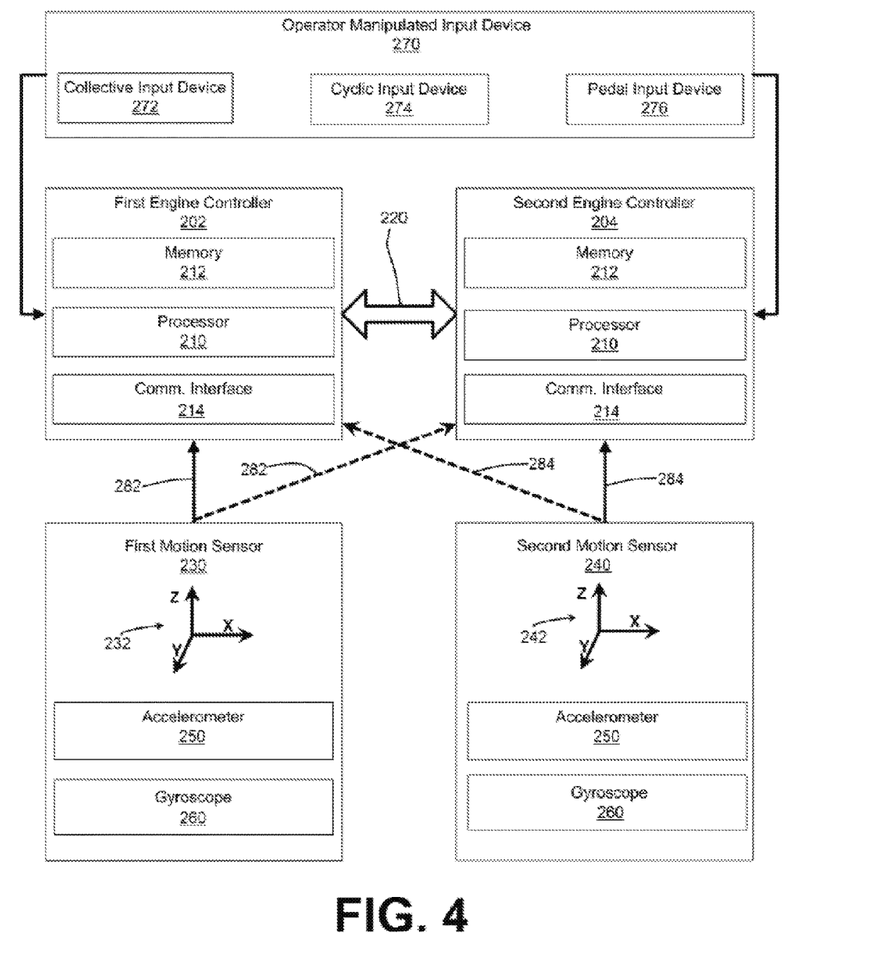
FIG. 4 illustrates a schematic view of another embodiment of a system for controlling fuel flow to a gas turbine engine in accordance with the present disclosure.

Referring now briefly to FIG. 4, another embodiment of the system 200 in accordance with the present disclosure is depicted. The exemplary system 200 depicted in FIG. 4 may be configured in substantially the same manner as the exemplary system 200 depicted in FIG. 3, and accordingly, the same or similar numbers may refer to the same or similar parts. For example, the system 200 includes a first engine controller 202 comprising a first motion sensor 230 and a second engine controller 204 comprising a second motion sensor 240. However, for the exemplary embodiment depicted in FIG. 4, the first and second motion sensors 230, 240 each include an accelerometer 250 and a gyroscope 260. The gyroscope 260 of the first motion sensor 230 detects rotation around at least one axis of the first orthogonal system 232, and the gyroscope 260 of the second motion sensor 240 detects rotation around at least one axis of the second orthogonal system 242.

In one exemplary embodiment, the first motion sensor 230 is mounted to the first gas turbine engine 40 of the aircraft 10, and the second motion sensor 240 is mounted to the second gas turbine engine 42 of the aircraft 10. In particular, the accelerometer 250 of the first motion sensor 230 is configured to detect acceleration of the aircraft 10 along at least one axis of the first orthogonal coordinate system 232, and the gyroscope 260 of the first motion sensor 230 is configured to detect rotation of the aircraft 10 around at least one axis of the first orthogonal coordinate system 232.

In the embodiment depicted in FIG. 4, the first motion sensor data 282 indicates movement of the aircraft 10 along and/or around at least one axis of the first orthogonal coordinate system 232, and the second motion sensor data 284 indicates movement of the aircraft 10 along and/or around at least one axis of the second orthogonal coordinate system 242. For example, if the aircraft 10 banks to its left, first motion sensor data 282 may indicate a magnitude of acceleration along the Z-axis and may further indicate rotation around the X-axis. The second motion sensor data 284 may also indicate acceleration along the Z-axis and rotation around the X-axis. It should be appreciated, however, that in still another embodiment, the first and/or second motion sensor 230, 240 may be configured as or include any other suitable motion sensors.

Additionally referring generally to both FIGS. 3 and 4, raw data (that is, the motion sensor data) from the first and second motion sensors 230, 240 may, in some embodiments, be compensated to minimize an error probability of the raw data. For example, raw data received from the accelerometer 250 may be filtered with an analog or digital filter to remove unwanted electrical noise. Further, raw data from the gyroscope 260 may be compensated to remove a drift error that is inherent to the gyroscope 260. In addition, the first and second engine controllers 202, 204 may receive flight control data from one or more sensors of the first and second gas turbine engines. For example, in one embodiment, the first engine controller 202 may receive a first signal indicating a torque $Q_1$ of the first gas turbine engine 40 and a second signal indicating a rotor speed $N_R$ of the output shaft 180. Additionally, the first gas turbine engine 40 may receive a third signal indicating a torque $Q_2$ of the second gas turbine engine 142. Further, the first engine controller 202 may compensate the raw data based, at least in part, on at least one of the torque $Q_1$ of the first gas turbine engine 140, the torque $Q_2$ of the second gas turbine engine 142, and the rotor speed $N_R$ of the output shaft 180.

Moreover, the first and second engine controllers 202, 204 may receive an operator initiated command from an operator manipulated input device 270 of the aircraft 10. More specifically, the operator manipulated input device 270 may include at least one of a collective input device 272, a cyclic input device 274, and a pedal input device 276. As will be discussed below in more detail, the system 200 may adjust fuel flow to the first and second gas turbine engines 40 and 42 based, at least in part, on the operator initiated command and the motion sensor data received from at least one of the first motion sensor 230 and the second motion sensor 240.

The collective input device 272 may, in some embodiments, include a lever configured to adjust a pitch angle of the main rotor blades 24. For example, the pitch angle of main rotor blades 24 may increase in response to an operator raising the collective input device 272, specifically the lever, relative to an initial position. In contrast, the pitch angle of the main rotor blades 24 may decrease in response to an operator lowering the collective input device 272, or lever, relative to the initial position. Further, since adjusting the pitch angle of the main rotor blades 24 necessarily increases or decreases drag on the aircraft 10, the operator must rotate the collective input device 272, or lever, to adjust the engine power of the first and second gas turbine engines 140, 142 and maintain the desired rotor speed, $N_R$, of the output shaft 180. More specifically, rotating the collective input device 272, or lever, in a first direction increases a rotational speed $N_G$ of the gas generator shaft 160. Further, increasing the rotational speed $N_G$ of the gas generator shaft 160 increases the rotational speed $N_P$ of the power turbine shaft 170. Still further, increasing the rotational speed $N_P$ of the power turbine shaft 170 increases the rotational speed $N_R$ of the output shaft 180. In contrast, rotating the collective input device 272, or lever, in a second direction decreases the rotational speed $N_G$ of the power turbine shaft 160.

In general, the exemplary embodiments of the system 200 mentioned above and depicted in FIGS. 3 and 4 provide various advantages. In particular, the system 200 improves handling of the aircraft, because the system 200 estimates changes in engine power demand based, at least in part, on motion sensor data from two or more motion sensors spaced apart from one another on the aircraft 10. Such a configuration may therefore capture all the aircraft load data that has a physical effect on its handling, even if such load data is unsensed. More specifically, the system 200 adjusts a fuel flow to a gas turbine engine of the aircraft based, at least in part, on the estimated change in engine power demand. In addition to improved handling, the system 200 provides a solution to legacy aircraft that predates the birth of digital engine control, because the system 200 may anticipate operator commands based, at least in part, on the motion sensor data from the two or more motion sensors of the aircraft. Accordingly, the system 200 may adjust fuel flow to the gas turbine engine of the aircraft based, at least in part, on detected movement of the aircraft.

Figure 5:
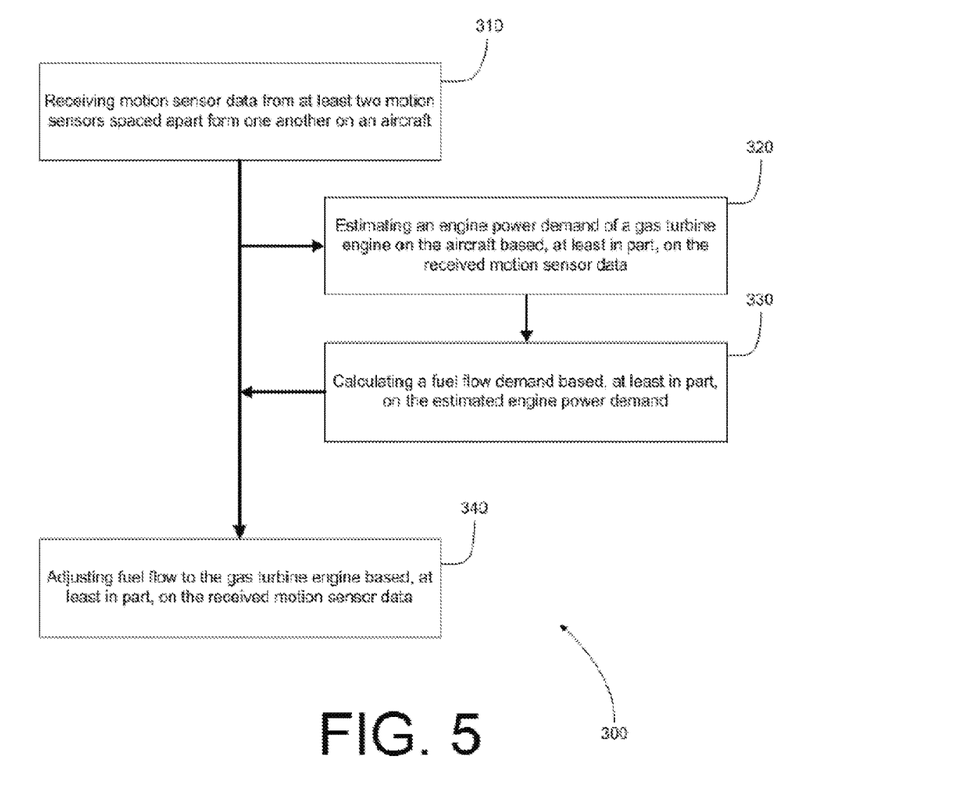
FIG. 5 illustrates a flow diagram of one embodiment of a method for automatically controlling fuel flow to a gas turbine engine of an aircraft based on received motion sensor data indicating motion of the aircraft.

Referring now to FIG. 5, a flow diagram of one embodiment of a method for automatically controlling fuel flow to a gas turbine engine of an aircraft is illustrated in accordance with the present disclosure. The exemplary method 500 of FIG. 7 may be utilized with the exemplary system 200 described above with reference to FIGS. 3 and 4. In addition, although FIG. 5 depicts steps performed in a particular order for purposes of illustration and discussion, the methods discussed herein are not limited to any particular order or arrangement. One skilled in the art, using the disclosures provided herein, will appreciated that various steps of the methods disclosed herein can be omitted, rearranged, combined, and/or adapted in various ways without deviating from the scope of the present disclosure.

As shown in FIG. 5, the method (300) includes, at (310), receiving motion sensor data from a motion sensor, wherein the received motion sensor data is from at least two motion sensors spaced apart from one another, separated from one another by a distance to form a moment arm (e.g., positioned on/associated with separate engines of an aircraft). For example, motion sensor data from a first motion sensor of the aircraft may include a vector quantity (e.g., magnitude and direction) and motion sensor data from a second motion sensor of the aircraft may also include a vector quantity (e.g., magnitude and direction). Additionally, as will be appreciated, (310) may further include processing the data received from the at least two, spaced apart motion sensors to determine additional motion information of the aircraft. For example, the at least two motion sensors may each be relatively low degree-of-freedom motion sensors (e.g., each three degrees of freedom sensors), and the method (300) may further include at (310) processing the data from the at least two motion sensors to determine higher, and more useful, degree of freedom information about the aircraft (e.g., six degrees of freedom information).

At (320), the method (300) includes estimating an engine power demand based, at least in part, on the received motion sensor data. As indicated above, estimating the engine power demand further includes correlating the received motion sensor data to a predetermined maneuver (e.g., bank, roll, climb, descent) of the aircraft. Further, in some embodiments, estimating the engine power demand may be based, at least in part, on the received motion sensor data and an operator initiated input command received from an operator manipulated input device.

At (330), the method includes calculating a fuel flow demand based, at least in part, on the estimated engine power demand. It should be appreciated that methods for calculating fuel flow demand based on engine power demand are known within the art. It should also be appreciated that the present disclosure is not limited to any particular method for calculating fuel flow demand based on engine power demand.

At (340), the method (300) includes adjusting a fuel flow to the gas turbine engine such that the adjusted fuel flow matches the calculated fuel flow demand. Specifically, in one embodiment, the first engine controller may actuate a fuel metering valve of the first gas turbine engine to adjust a fuel flow to the combustion section of the first gas turbine engine. It should be appreciated that the second engine controller may actuate a fuel metering valve of the second gas turbine engine to adjust a fuel flow to the combustion section of the second gas turbine engine.

In general, the exemplary embodiment of the method mentioned above and depicted in FIG. 7 provides various advantages. In particular, the system 200 provides improved handling of an aircraft, because the system 200 anticipates changes in engine power demand of the gas turbine engine, at least in part, on motion sensor data from at least two motion sensors of the aircraft. More specifically, the system optimizes fuel flow to maintain rotational speed of the output shaft and prevent blade droop.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a fuel flow to one or more gas turbine engines of an aircraft, the method comprising:
   receiving, by an engine controller of the one or more gas turbine engines, motion sensor data from at least two motion sensors spaced apart from one another and associated with a respective gas turbine engine of the aircraft, the received motion sensor data indicating motion of the aircraft, wherein the at least two motion sensors includes a first motion sensor and a second motion sensor, wherein the first motion sensor is configured to sense a first type of motion data, and wherein the second motion sensor is configured to sense a second type of motion data;
   determining, by the engine controller of the one or more gas turbine engines, a third type of motion data of the aircraft based on the first type of motion data and the second type of motion data, wherein the third type of motion data is different than the first type of motion data and the second type of motion data; and
   adjusting the fuel flow to the gas turbine engine, the adjusted fuel flow based, at least in part, on the received motion sensor data.

2. The method of claim 1, wherein the first type of motion data indicates motion of the aircraft along at least one axis of a first orthogonal coordinate system, and wherein the second type of motion data indicates motion of the aircraft along at least one axis of a second orthogonal coordinate system.

3. The method of claim 2, wherein the first type of motion data is a linear speed or acceleration, wherein the second type of motion data is also a linear speed or acceleration, and wherein the third type of motion data is a rotation of the aircraft.

4. The method of claim 3, wherein adjusting the fuel flow to the gas turbine engine further includes estimating an engine power demand based, at least in part, on the determined rotation of the aircraft.

5. The method of claim 1, further comprising:
   receiving an operator initiated command through an operator manipulated input device of the aircraft.

6. The method of claim 5, wherein the adjusted fuel flow is based, at least in part, on the received motion sensor and the operator initiated command.

7. The method of claim 5, wherein the operator manipulated input device includes at least one of a collective input device, a cyclic input device, and a pedal input device.

8. The method of claim 1, wherein the first type of motion data indicates motion of the aircraft along or about at least one axis of a first orthogonal coordinate system, and wherein the second type of motion data indicates motion of the aircraft along or about at least one axis of a second orthogonal coordinate system.

9. The method of claim 8, wherein the third type of motion data is a rotation of the aircraft.

10. A system for an aircraft having a first gas turbine engine and a second gas turbine engine, the system comprising:
- a first engine controller comprising a first motion sensor defining a first orthogonal coordinate system, the first motion sensor configured for determining a first type of motion data indicating motion of the aircraft along at least one axis of the first orthogonal coordinate system; and
- a second engine controller comprising a second motion sensor defining a second orthogonal coordinate system, the second motion sensor spaced apart from the first motion sensor and configured for determining a second type of motion data indicating motion of the aircraft along at least one axis of the second orthogonal coordinate system, the second engine controller communicatively coupled to the first engine controller such that the first engine controller receives the second type of motion data;
- wherein the first engine controller is configured to determine a third type of motion data of the aircraft based on the first type of motion data and the second type of motion data, wherein the third type of motion data is different than the first type of motion data and the second type of motion data.

11. The system of claim 10, wherein the third type of motion data is a rotation of the aircraft.

12. The system of claim 11, wherein the first engine controller is further configured to adjust a fuel flow to the first gas turbine engine based, at least in part, on the determined third type of motion data.

13. The system of claim 11, wherein the first and second engine controllers are configured to receive an operator initiated command through an operator manipulated input device.

14. The system of claim 13, wherein the first engine controller is configured to adjust a fuel flow to the first gas turbine engine based, at least in part, on the determined third type of motion data and the operator initiated command.

15. The system of claim 13, wherein the operator manipulated input device comprises at least one of a collective input device, a cyclic input device, and a pedal input device.

16. The system of claim 10, wherein the first type of motion data indicates motion of the aircraft along and about at least one axis of the first orthogonal coordinate system, wherein the second type of motion data indicates motion of the aircraft along and about at least one axis of the second orthogonal coordinate system, and wherein the third type of motion data is a rotation of the aircraft.

17. The system of claim 16, wherein the first and second engine controllers are configured to receive an operator initiated command through an operator manipulated input device, and wherein the first engine controller adjusts a fuel flow to the first gas turbine engine based, at least in part, on the operator initiated command and the determined rotation of the aircraft.

18. The method of claim 1, wherein the one or more gas turbine engines comprises a first gas turbine engine and a second gas turbine engine, wherein the first motion sensor is associated with the first gas turbine engine, and wherein the second motion sensor is associated with the second gas turbine engine.

19. The method of claim 1, wherein the first type of motion data is different than the second type of motion data.

20. The method of claim 1, wherein the first type of motion data is the same as the second type of motion data.

* * * * *